US008250480B2

(12) United States Patent
Barnes et al.

(10) Patent No.: US 8,250,480 B2
(45) Date of Patent: Aug. 21, 2012

(54) INTERACTIVE NAVIGATION OF A DATAFLOW PROCESS IMAGE

(75) Inventors: Andrew Barnes, O'Fallon, MO (US); Gary VonderHaar, Wildwood, MO (US); Joe Busateri, Lake St. Louis, MO (US); Matthew Hopkins, St. Peters, MO (US); Dan Martin, Saint Louis, MO (US)

(73) Assignee: Mastercard International, Inc., Purchase, NY (US)

( * ) Notice: Subject to any disclaimer, the term of this patent is extended or adjusted under 35 U.S.C. 154(b) by 810 days.

(21) Appl. No.: 12/191,790

(22) Filed: Aug. 14, 2008

(65) Prior Publication Data

US 2010/0042938 A1 Feb. 18, 2010

(51) Int. Cl.
*G06F 3/00* (2006.01)
*G06F 3/048* (2006.01)
*G06K 9/34* (2006.01)
*G09G 5/00* (2006.01)

(52) U.S. Cl. ........ 715/764; 715/762; 715/853; 382/173; 345/660

(58) Field of Classification Search .................. 715/762, 715/764, 853; 382/173, 171, 164; 717/155, 717/105; 345/121, 660, 19; 701/208
See application file for complete search history.

(56) References Cited

U.S. PATENT DOCUMENTS

| | | | |
|---|---|---|---|
| 5,905,496 A | 5/1999 | Lau et al. | |
| 6,100,897 A * | 8/2000 | Mayer et al. | 345/428 |
| 6,202,026 B1 * | 3/2001 | Nimura et al. | 701/211 |
| 6,247,019 B1 * | 6/2001 | Davies | 1/1 |
| 6,307,573 B1 * | 10/2001 | Barros | 715/764 |
| 7,158,878 B2 | 1/2007 | Rasmussen et al. | |
| 7,209,148 B2 | 4/2007 | Rasmussen et al. | |
| 7,225,207 B1 | 5/2007 | Ohazama et al. | |
| 7,865,301 B2 * | 1/2011 | Rasmussen et al. | 701/208 |
| 7,900,153 B2 * | 3/2011 | Damodaran et al. | 715/764 |
| 7,920,963 B2 * | 4/2011 | Jouline et al. | 701/208 |
| 2005/0251747 A1 | 11/2005 | Dolling et al. | |
| 2008/0071710 A1 * | 3/2008 | Serre et al. | 706/20 |
| 2009/0117921 A1 * | 5/2009 | Beydler et al. | 455/457 |

* cited by examiner

*Primary Examiner* — Ting Lee
(74) *Attorney, Agent, or Firm* — Hoffman & Baron, LLP

(57) ABSTRACT

An interactive graphical environment that facilitates interactive navigation of a reconstructed dataflow process image is disclosed. The environment can create segmented image sections for at least one dataflow process image, which can be used to form the reconstructed dataflow process image. The environment can respond to inputs from a user to navigate the reconstructed dataflow process.

20 Claims, 18 Drawing Sheets

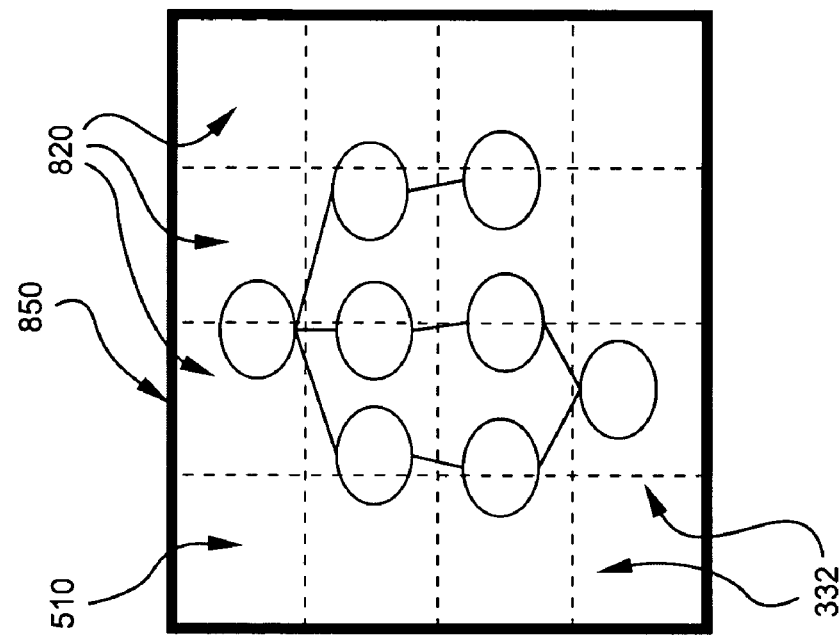
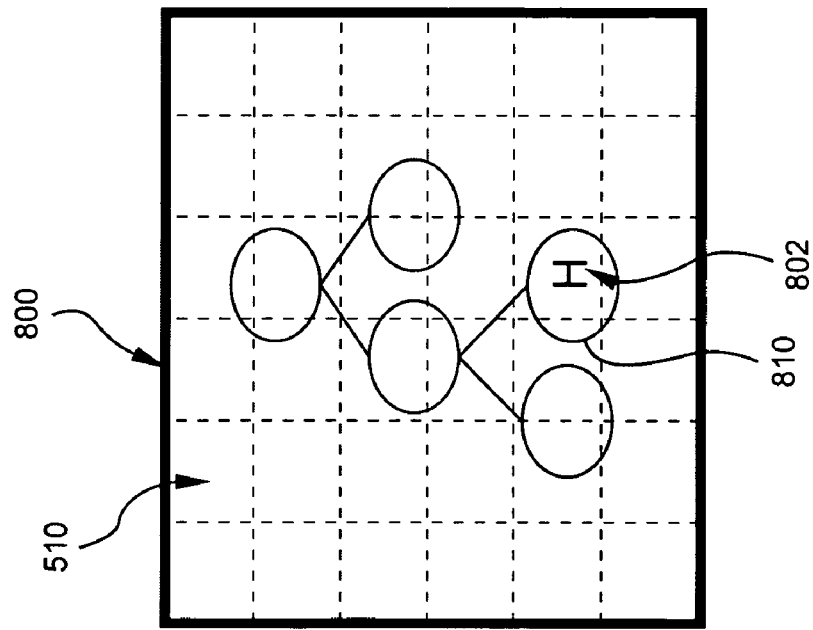
FIG. 8

INTERACTIVE NAVIGATION OF A DATAFLOW PROCESS IMAGE

BACKGROUND OF THE INVENTION

Dataflow process diagrams are used to represent the flow of data in a system. In their simple form, dataflow process diagrams can include nodes that represent operations implemented in the system and edges that interconnect the nodes to show how data flows through the system from node to node.

Typically these dataflow process diagrams can be illustrated using paper, poster board, plotter paper, or other tangible mediums. However, for large and/or complex systems, dataflow process diagrams can be large and it can be difficult to illustrate the dataflow processes in this manner. Further, illustrating the dataflow processes using a tangible medium offers little security to unauthorized access of the dataflow processes and limits the number of users who can view the dataflow processes to those users who have a hardcopy.

In recent years, computer applications have been implemented that allow users to generate and view dataflow processes using a computer display. These applications, however, are limited and generally do not overcome the burden involved with viewing an entire dataflow process diagram and navigating through the dataflow process diagram.

SUMMARY OF THE INVENTION

A method, system including at least one computing device, and medium including instructions executable by a computing device are disclosed that facilitate the navigating of an underlying dataflow process. A set of segmented image sections corresponding to a dataflow process image can be obtained and at least a portion of the set of segmented image sections can be displayed. The segmented image sections form a reconstructed dataflow process image of at least a portion of the dataflow process image when displayed. At least one of the segmented image sections can be associated with location information to facilitate navigation to a location of the at least one of the segmented image sections. Interactive navigation of the reconstructed dataflow process image occurs in response to inputs from a user.

Obtaining a set of segmented image sections can be achieved by obtaining a dataflow process image and dividing the dataflow process image into segmented image sections based on a pattern.

A user selectable component can be associated with at least a portion of the reconstructed dataflow process image, which when selected can result in the depiction of additional information associated with a portion of the reconstructed dataflow process image. The additional information and the reconstructed dataflow process image can be viewable simultaneously. In one embodiment, the additional information is overlaid over the reconstructed dataflow process image. A selection of the user selectable component can also result in the depiction of a reconstructed dataflow sub-process image using a second set of segmented image sections displayed, where the second set of segmented image sections form a reconstructed dataflow process image of the dataflow sub-process image.

A zoom level of the reconstructed dataflow process image can be changed so that greater or less detail of a region of the reconstructed dataflow image is viewable. In addition, or alternatively, a user can pan from a first region of the reconstructed dataflow process image to a second region of the reconstructed dataflow process image, where the first region of the reconstructed dataflow process image is represented using a first set of segmented image sections and the second region of the reconstructed dataflow process image is represented using a second set of segmented image sections. In some embodiments, the first and second sets of segmented image data structure sections have at least one segmented image section in common.

In addition, metadata, security features, and searching features can be associated with the reconstructed dataflow process image and/or with the segmented image sections. The meta data can include user specified information that can be displayed with the reconstructed dataflow process images. The security feature can prevent an unauthorized user from viewing the at least one segmented image section. The searching feature can allow a user to search a reconstructed dataflow process image to locate an aspect of the reconstructed dataflow process image.

The preferred embodiments of the present invention, as well as other objects, features and advantages of the present invention will be apparent from the following detailed description, which is to be read in conjunction with the accompanying drawings. The scope of the invention will be pointed out in the claims.

BRIEF DESCRIPTION OF THE DRAWINGS

FIG. 8 depicts navigating between hierarchical levels of a dataflow process image.

DETAILED DESCRIPTION OF PREFERRED EMBODIMENTS

The preferred embodiments are directed to enabling navigation of a dataflow process using one or more images of the dataflow process in an interactive graphical environment. To achieve this, the dataflow process image can be divided into segmented image sections that can be displayed in a matrix format so that the segmented image sections are positioned to form a single integrated seamlessly reconstructed image of the underlying dataflow process image. The reconstructed dataflow process image formed from the segmented image sections can be interactively navigated in response to inputs from a user.

One or more user selectable components, such as embedded links, can be associated with one or more of the segmented image sections. A user can select one or more of the user selectable components to navigate to the area in the reconstructed dataflow process image corresponding to the user selectable component, to display additional detailed information concerning the user selectable component, and/or to view another level of the hierarchy of the dataflow process.

A user can change zoom levels of the reconstructed dataflow process image so that more or less of the dataflow process is viewable on the display. When the zoom level is changed, the segmented image sections can be dynamically updated so that different segmented image data structure sections are used to form the single integrated reconstructed image of the dataflow process.

A "reconstructed image", as referred to herein, is an image formed a separate segmented image sections that when aligned according to location information form an image that is substantially identical to an underlying image of used to form the segmented image sections.

Figure 1:
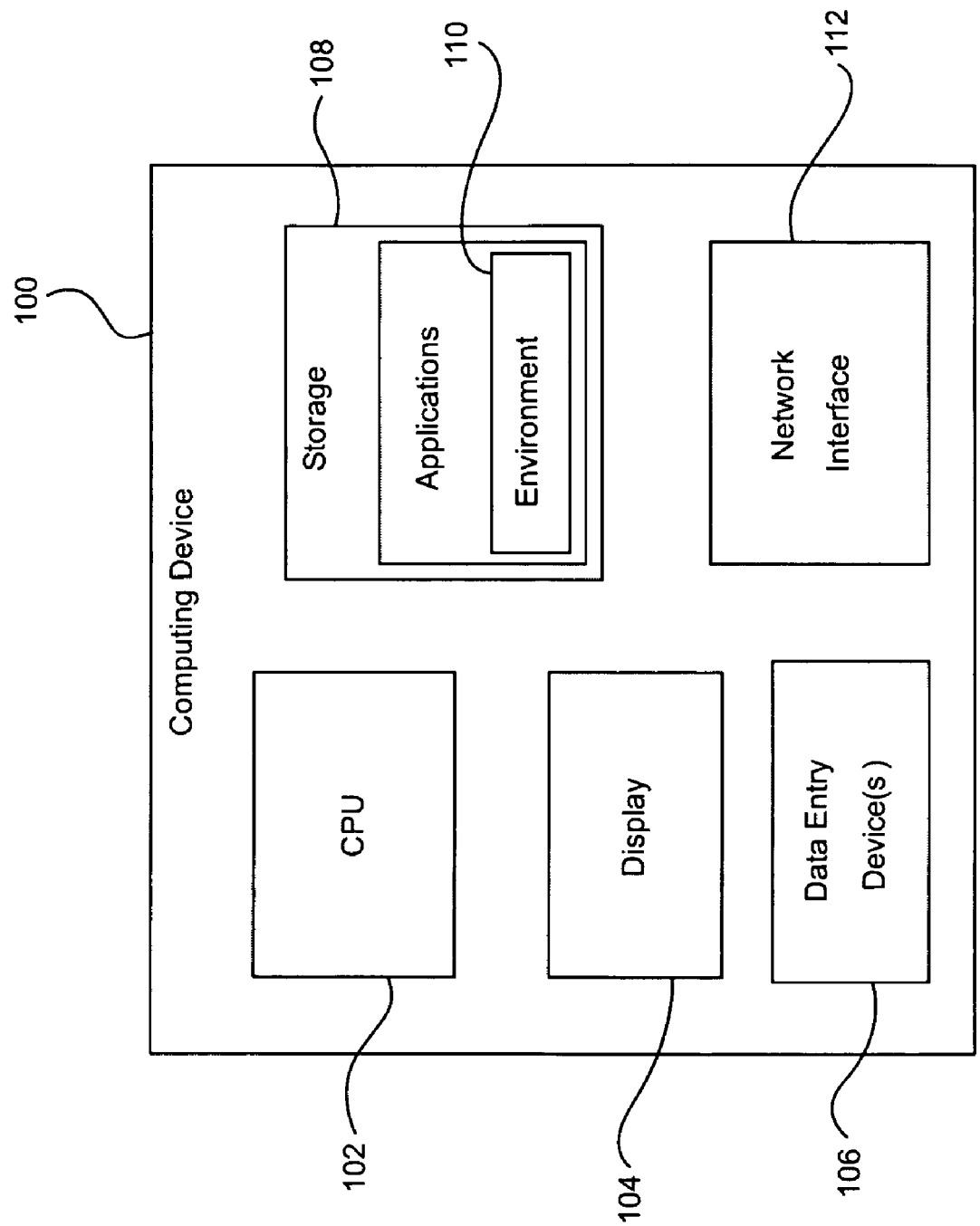
FIG. 1 is a block diagram of an exemplary computing device for implementing embodiments of the present invention.

FIG. 1 depicts an exemplary computing device 100 suitable for practicing the embodiments of the present invention. The computing device 100 can be a mainframe, personal computer (PC), laptop computer, workstation, handheld device, such as a PDA, a cell phone, or the like. In the illustrated embodiment, the computing device 100 includes a central processing unit (CPU) 102 and a display device 104. The CPU 102 controls each component of the computing device 100 to provide components of a interactive graphical, which is discussed in more detail below. The display device 104 enables the computing device 100 to communicate directly with a user through a visual display and can graphically render reconstructed dataflow process images in the interactive graphical environment. The computing device 100 can further include data entry device(s) 106, such as a keyboard, touch screen, mouse, and the like to allow the user to interact with the dataflow process image in the interactive graphical environment. The computing device 100 can include storage 108 for storing data, such as dataflow process images, segmented image sections of the dataflow process images, instructions, such as instruction for generating segmented image sections and/or rendering dataflow process images graphically using the segmented image sections. The storage 108 can include such technologies as a floppy drive, hard drive, tape drive, Flash drive, optical drive, read only memory (ROM), random access memory (RAM), and the like.

Applications, such as the interactive graphical environment 110 (hereinafter "environment 110"), can be resident in the storage 108. The storage 108 can be local or remote to the computing device 100. The computing device 100 can also include a network interface 112 for communicating with a network and can be used for a distributed implementation. The CPU 102 operates to run the applications, such as the environment 110, in storage 108 by performing instructions therein and storing data resulting from the performed instructions, which may be graphically depicted via the display 104.

The environment 110 can generate segmented image sections from a dataflow process image, can reconstruct dataflow process images from segmented image sections, and/or can provide an interactive graphical user interface that allows users to navigate the dataflow process images to discern information about the underlying dataflow process. The environment 110 can include code known to those skilled in the art that when executed can provide an interactive dataflow process image as described herein. The code can be composed of at least one of C, C++, Java, Basic, Perl, assembly language, machine code, or the like.

Figure 2:
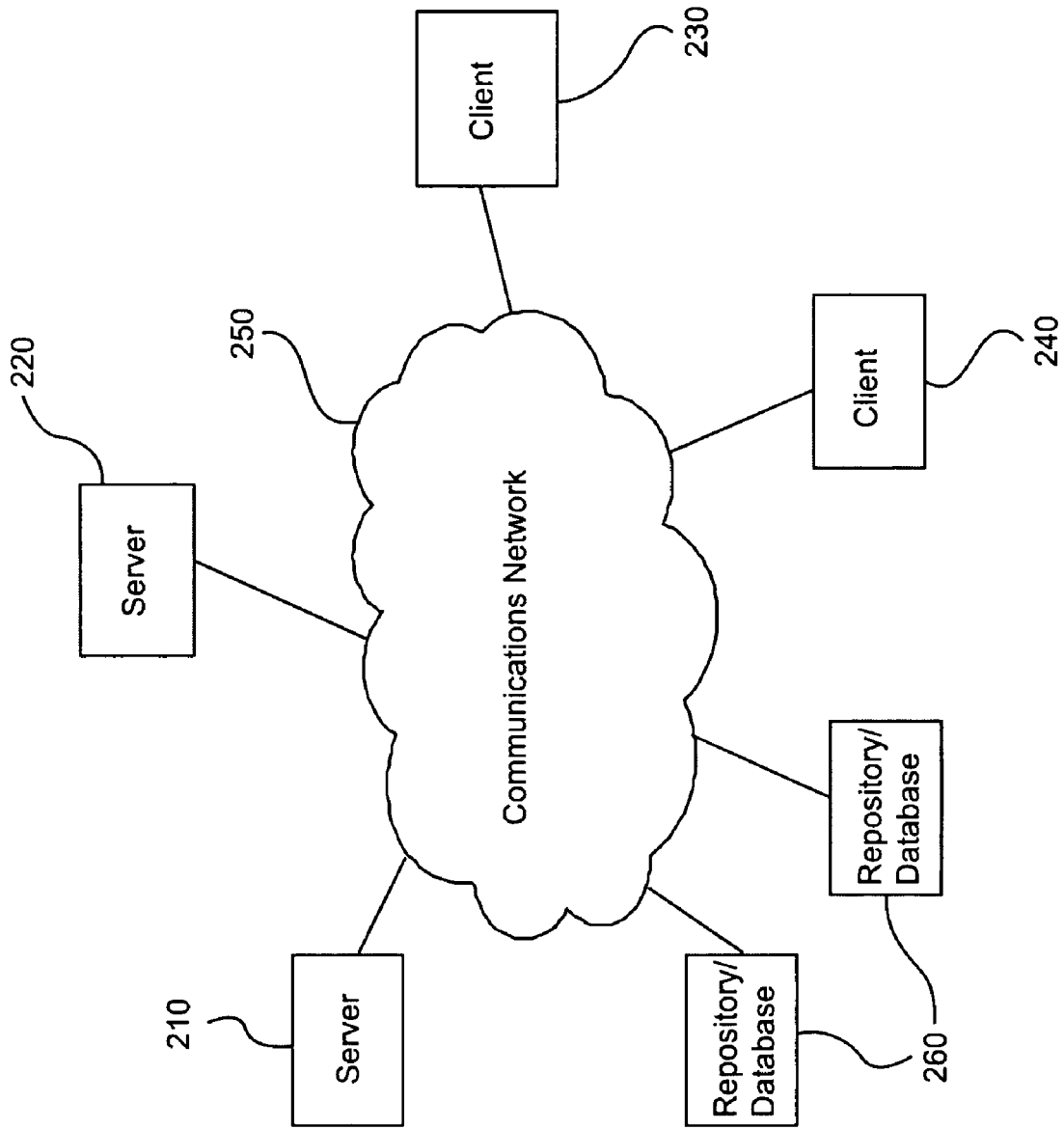
FIG. 2 is a distributed system for implementing a distributed embodiment of the present invention.

FIG. 2 depicts a distributed system 200 for implementing one embodiment of the environment 110. The distributed system 200 includes one or more servers 210 and 220 coupled to clients 230 and 240 via a communication network 250. The servers 210/220 and/or the clients 230/240 can be implemented using the computing device 100 of FIG. 1. The distributed system 200 preferably includes one or more repositories or database 260, which can be in communication with each other, as well as with the servers 210 and 220 and the clients 230 and 240, via a communications network 250.

The servers 210/220, clients 230/240, and/or databases 260 can store information, such as dataflow process images for different dataflow processes and/or for different zoom levels of a dataflow process image, and can store segmented image sections of the dataflow process images. The environment 100 can be distributed among the servers 210/220, clients 230/240, and databases 260 such that one or more components of the environment 100 can be located at different device (e.g. clients, servers, databases) in the communication network 250.

Figure 3:
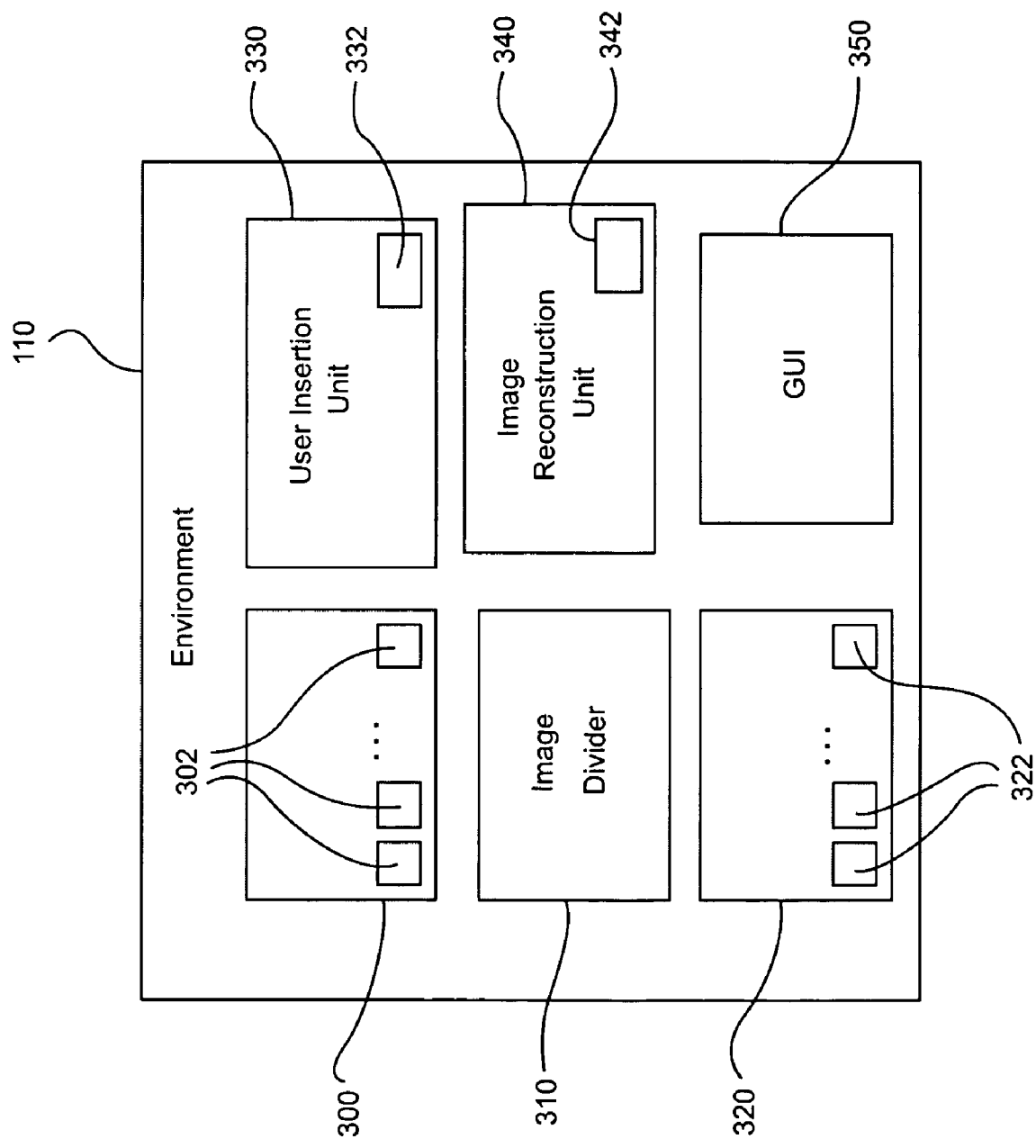
FIG. 3 is a block diagram of an interactive graphical environment for generating and interactively displaying dataflow process images.

FIG. 3 is a block diagram of the environment 110 and includes a collection 300 of dataflow process images 302, an image divider 310, a collection 320 of sets of segmented image sections 322, a user insertion unit 330, an image reconstruction unit 340, and a graphical user interface (GUI) 350, which is discussed in more detail with reference to FIG. 5. In some embodiments, the image reconstruction unit 340 can be a third party application, such as Google Maps from Google™.

The collection 300 of dataflow process images 302 can be generated using underlying dataflow process diagrams that can be used to illustrate how data flows through a system and can provide a reference of the steps and/or operations performed by the system. The dataflow process images can be stored in an image file format, such as a GIF, JPEG, TIFF, BMP, or other suitable image file format. The collection 300 of dataflow process images can include several images of each dataflow process diagram at different discrete zoom levels such that a set of images ranging from a broad overview of the dataflow process diagram to a detailed view of the features of the dataflow process diagram can be obtained to provide flexibility to a user wishing to view various details of the dataflow process image.

The collection 300 of dataflow images 302 can be stored in storage 108 of the computing device 100, as discussed with reference to FIG. 1 or can be distributed and/or stored remotely over the communication network 250, as discussed with reference to FIG. 2. The dataflow process images can provide an underlying image that can be used to create the collection 320 of segmented image sections 322.

The image divider 310 can receive one or more dataflow process images 302 from the collection 300 and can divide the dataflow process images 302 into segmented image sections 322. The image divider 310 can divide each of the data flow images 302 into a predefined number of segmented image sections 322 according to a pattern, such as a matrix pattern or other pattern, so that each of the dataflow process images 302 can be separated into a set of segmented image sections 322, which can be used subsequently to recreate the dataflow process image 100. As a result of the dividing, an element, such as a node or edge depicted in the dataflow process image can be divided among two or more segmented image sections such that to view the element each segmented image section associated with the element is, at least partially, depicted. The image divider 310 can associate absolute location information with each of the separate segmented image sections 322 that corresponds to the location that each of the segmented image sections 322 occupied in the original dataflow process images 302. The absolute location information of each of the segmented image sections can be used to identify other segmented image sections that were positioned adjacently to the segmented image section in the original dataflow process image 100. In this manner, the location of each of the segmented image sections in the matrix can be determined relative to the other segmented image sections in the matrix.

For example, in the present embodiment, each of the segmented image sections 322 have absolute location information that corresponds to a coordinate system having a row values, 0-I, and a column values, 0-J, where I and J can be any number such that a I−1 by J−1 [I−1×J−1] matrix exists. In this embodiment, the location information of each of the segmented image sections 322 can have a form of (R,C), where "R" represents a row location and "C" represents a column location. For example, the absolute location information of the segmented image section located in the top left corner of the original dataflow process image can be (0,0) representing the first row and the first column in the matrix. Likewise, the absolute location information of the segmented image section at the bottom right corner of the original dataflow image can be (I−1, J−1) representing the last row and column in the matrix.

While the above embodiment uses a matrix type coordinate system for the absolute location of the segmented image sections, those skilled in the art will recognize that other coordinate systems can be used, such as a conventional X-Y coordinate system, where "X" represents a horizontal displacement from an origin point and Y represents a vertical displacement from the origin point. The origin point can be anywhere on the dataflow process image and is preferably located in the center of the image.

The image divider 310 can divide each of the dataflow process images 302 into sets of segmented image sections 322 when a new dataflow image is available, after which the dividing can be performed when the dataflow process image changes. In some embodiments, where a number of segmented image sections less than a total number of segmented image sections in a set change, those segmented image sections that changed are updated, while the remaining segmented image sections remain unchanged. In other embodiments, the complete set of segmented image sections are changed whenever there is a change to the underlying dataflow process image.

Dataflow process images 302 of a dataflow process diagram can be obtained for K discrete zoom levels, where the zoom levels can be 0, 1, 2, . . . , K. A zoom level of "K" can represent the highest zoom level where the detailed features of the dataflow process image can be viewed the clearest. In this manner a set of contiguous, pre-rendered dataflow process images 302 of the entire dataflow process are generated with different zoom levels such that at least one dataflow process image is provided for each zoom-level and hierarchical level. Segmented image sections 322 can be generated by the image divider 310 for each discrete zoom level 0-K. The sets of separate segmented image sections 322 for the discrete zoom levels can be stored for future use. For embodiments that implement multiple discrete zoom levels, the absolute location information associated with the segmented image sections 322 can be extended to three dimensions, such that the absolute location information can have a form of (R,C,Z), where "Z" represents a zoom level associated with each of the segmented image sections 322.

Each of the segmented image sections 322 can have a uniform size and preferably have a rectangular configuration with a pixel width Wp and a pixel length Lp. As such, the segmented image sections can be formed from an array of pixels, which can be identified according to a pixel coordinate system so that pixel positions within each of the segmented image sections can be identified according to a location associated with the coordinate system. In one embodiment, the pixel coordinate system is implemented in an identical manner as the coordinate system for the segmented sections using rows and columns. For example, the top left-most pixel in a segmented image section can have the coordinates (0,0), while the bottom right-most pixel can have the coordinates (Wl−1, Lp−1).

The collection 320 of segmented image sections 322 can be stored in storage 108 of the computing device 100, as discussed with reference to FIG. 1 or can be distributed and/or stored remotely over the communication network 250, as discussed with reference to FIG. 2. The segmented image sections 322 can be used to recreate the dataflow process images 302.

Still referring to FIG. 3, the user insertion unit 330 can allow a user to insert metadata and location point markers into a segmented image sections. Location point markers can be used to identify a location of interest on the reconstructed dataflow process image. Metadata 332 can be associated with one or more of the segmented images sections 322 and/or location point markers. For example, the user can associate metadata, such as an explanation of an element depicted by one of the segmented image sections, a revision number, a date of revision, a name of the user who revised the segmented image section or the underlying dataflow process, a source (e.g., a department in a company, such as human resources) from which a section depicted by a segmented image section originated, a location marker that can overlay the segmented image section when the segmented image section is displayed, a selectable component, such as an embedded link, and the like. The metadata inserted by the user can be searchable when the segmented image sections 322 are displayed via the GUI 350. The metadata can be stored in the same file as the segmented image section or can be stored in a separate file that is associated with the segmented image section.

The image reconstruction unit 340 can retrieve or otherwise obtain a set of segmented image sections 322 that correspond to one of the dataflow process images 302 that the user wishes to view. The reconstruction unit 340 can include a grid 342, discussed in more detail in FIG. 5, to orient the set of segmented image sections 322 according to the absolute location information associated with the segmented image sections in the set. The grid 342 can be composed of sections having a shape that matches the shape of the segmented image sections 322 so that the segmented image sections can occupy a section of the grid.

Figure 4:
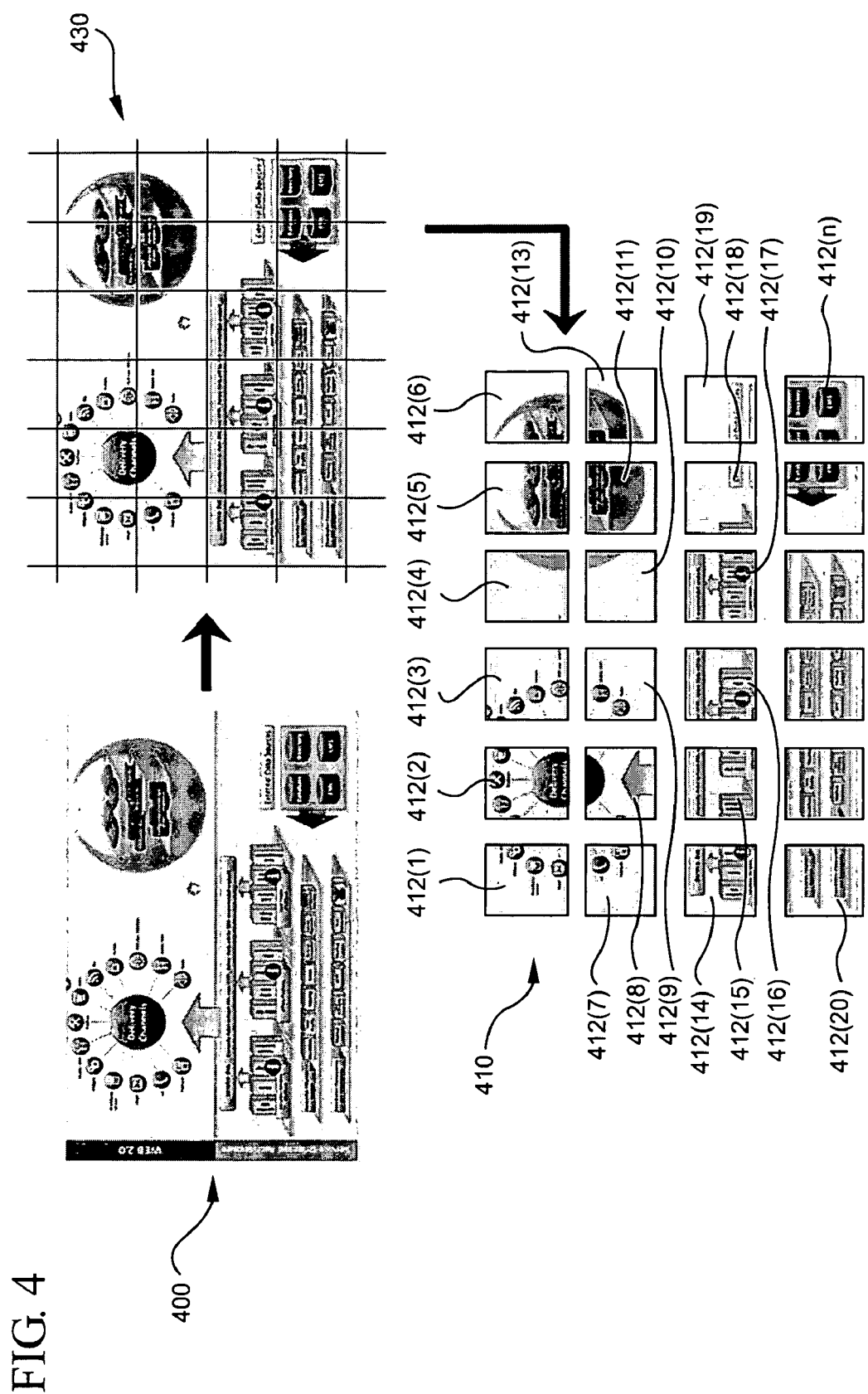
FIG. 4 illustrates an example of generating segmented image sections from a dataflow process image.

FIG. 4 shows an illustrative example of dividing a dataflow process image 400 into a set 410 of segmented image sections 412(1)-412(n). The environment 110 can obtain the dataflow process image 400 and can divide the segmented image sections 412(1)-412(n) using the image divider, which can divide the dataflow process image 400 into segmented image sections 412(1)-412(n) of a predefined size and shape. In the present example, the dataflow process image is divided into rectangular segmented image sections, based on for example, a matrix pattern illustrated using grid 430. One skilled in the art will recognize that the environment 110 may or may depict the dividing of the dataflow process image 410 to the user and that FIG. 4 is provided to illustrate the formation of the segmented image sections 412(1)-412(n).

The segmented image sections 412(1)-412(n) can be associated with absolute location information so that the environment can reconstruct the dataflow process image and can be stored in any suitable format. In one embodiment, Rich Map Format (RMF) files can be generated for the segmented image sections to provide a compact, binary format file optimized for spatial query processing, where the segmented image sections are organized in a multi-dimension fashion, such that segmented image sections near each other in the dataflow process image are stored close together in storage. As a result, once a segmented image section in a spatially formatted dataset is retrieved, other segmented image sections close by can be retrieved with relative ease. Those skilled in the art will recognize that there are many other ways to organize the segmented image sections, such as sequentially or hierarchically stored data files.

Figure 5:
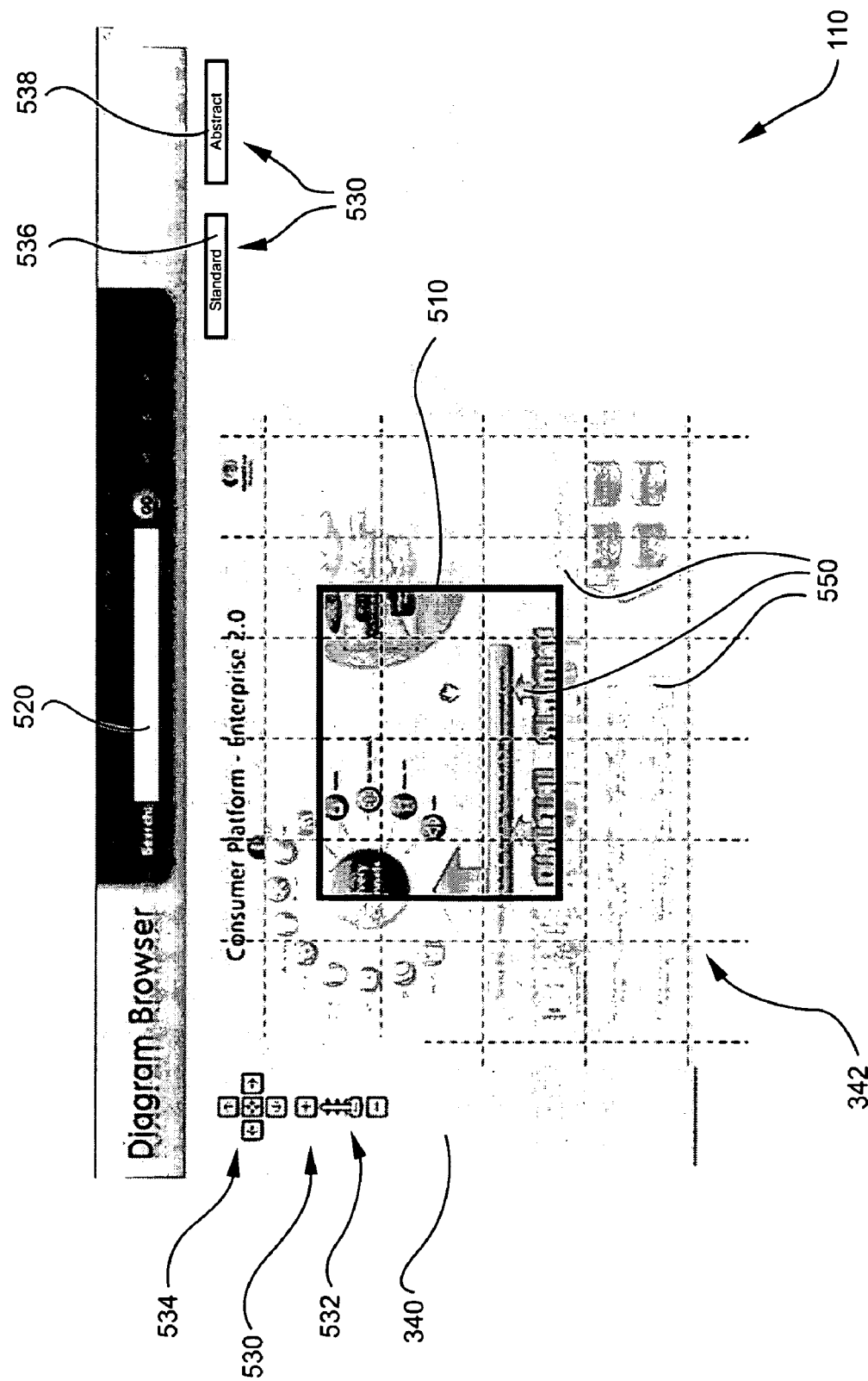
FIG. 5 depicts an exemplary embodiment of a graphical user interface (GUI) that can be generated by the interactive graphical environment of FIG. 3.

FIG. 5 depicts an exemplary GUI 350 of the environment 110 that preferably includes a viewing area 510, one or more data entry fields 520, and one or more control buttons 530. The viewing area 510 is preferably rectangular, although, other shapes and configurations can be implemented, such as circular, triangular, or the like, and can have a specified pixel area. For example, the viewing area 510 can be rectangular with a total pixel width Wt and a total pixel length Lt and can have a view coordinate system (wt, lt), where wt represents a horizontal pixel location and It represents a vertical pixel location. The viewing area 510 provides an area in the GUI 350 for displaying at least a portion of a dataflow process image using the segmented image sections.

The one or more data entry fields 520 can allow a user to interact with the interactive reconstructed dataflow process image. For example, the reconstructed interactive dataflow image can be searchable and a user can enter text into the one or more data entry fields to implement a find or locate function, where the environment 110 can process the entered text and can mark, highlight, zoom-in on, and/or center a portion of the interactive reconstructed dataflow process image that corresponds to the entered text.

The one or more control buttons 530 can be selected by the user to perform various functions. For example, the one or more control button can include zoom control buttons 532 to allow the user to zoom-in on a selected portion of the dataflow process image or to zoom-out on the dataflow process image so that more of the dataflow process image is viewable. The one or more control buttons 530 can also include pan control buttons 534 that can reposition the moveable grid with respect to the viewable area 510 according to the view coordinate system (wt,lt) of the viewable area 510 by a predetermined amount. In some embodiments, the one or more control buttons 530 can include view type control buttons, such as a first view button 536 and a second view button 538 to depict the dataflow process in a first view or a second view, respectively.

Still referring to FIG. 5, the grid 342 can have sections 550, each of which can be associated with a section number. One skilled in the art will recognize that the grid 342 may or may not be displayed to the user and that the grid 342 and that the grid is on implementation for aligning the segmented image sections. In the present embodiment, the grid 342 facilitates positioning of the segmented image sections in the sections 550 according to their absolute location information. The segmented image sections can be aligned so that there is no noticeable discontinuity between the segmented image sections so that the segmented image sections 322 are aligned to reconstruct a single integrated seamless image of one of the dataflow process images 302. In generally, the grid 342 can be larger than the viewable area 510 and the viewable area 510 can prevent portions of the grid 342 that extend beyond the boundaries of the viewable area 510 from being displayed.

The grid 342 can be moved with reference to the view coordinate system (wt,lt) of the viewable area 510 to move portions of the grid 342 into and out of the viewable area 510 generating a smooth and continuous panning motion where the segmented image sections drift in unison through the viewable area 510. To implement panning, the user can select a location in the viewable area 510 by, for example, positioning a mouse pointer over a location and clicking on and holding down a mouse button, and subsequently dragging the location within the viewing area 510 to a desired location by moving the mouse pointer. As the user drags the selected location, the grid 342 shifts so that segmented image sections, or portions thereof, that were not previously viewable become viewable. Those skilled in the art will recognize that the grid 342 is depicted to illustrate the positioning of the segmented image sections and may or may not be visible to the user.

Figure 6:
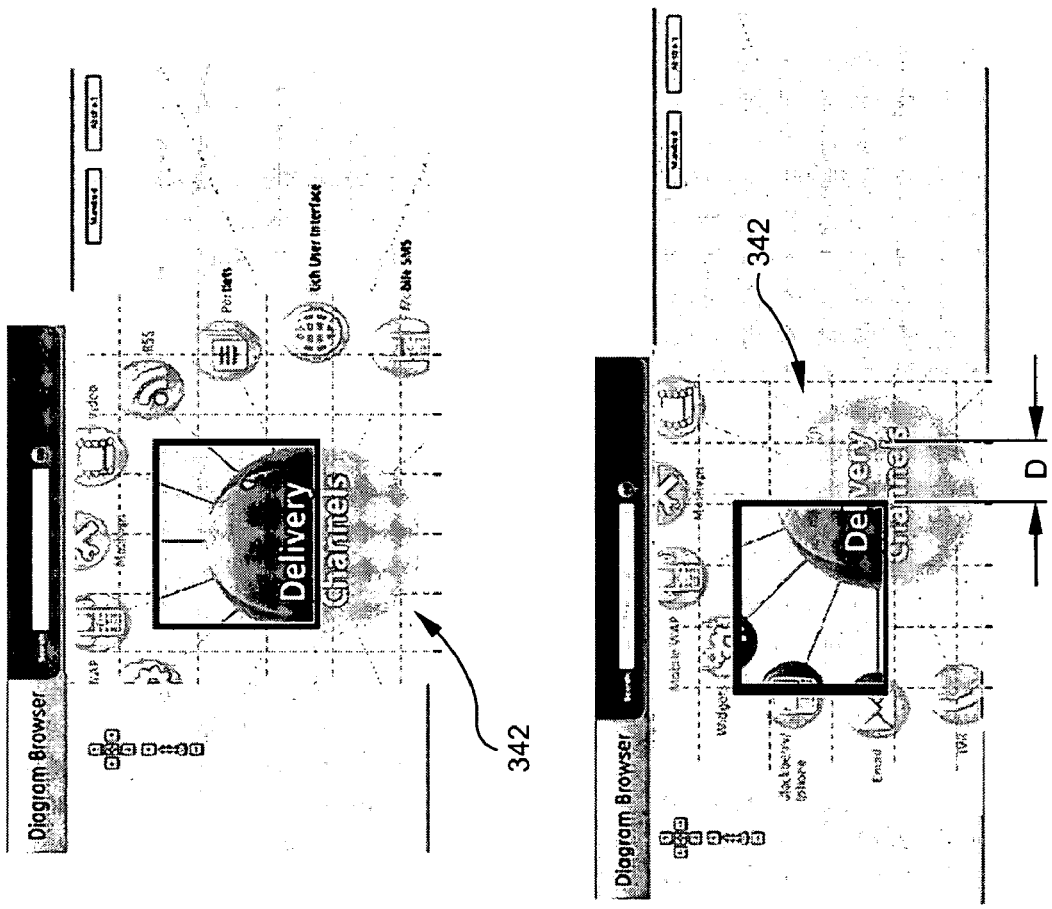
FIG. 6 depicts an exemplary panning operation that can be performed in accordance with embodiments of the present invention.

Referring to FIG. 6, if the grid 342 is displaced by a predefined distance D as a result of panning, the grid 342 can be reconfigured so that some of the sections of the grid 342 can be eliminated and new sections can be added to the grid 342. The segmented image sections in the eliminated grid sections are removed and new segmented image section are positioned in the new grid sections. For example, the user may pan horizontally to the right beyond the predefined distance; thereby resulting in an elimination of the right-most grid sections and an addition of grid sections at the left-most portion of the grid. The new grid sections can be populated by additional segmented image sections so that an additional portion of the dataflow process image can be viewed. The additional segmented images can be positioned relative to the segmented image section already in the grid 342 based on the absolute location information associated with the segmented image sections.

Figure 7:
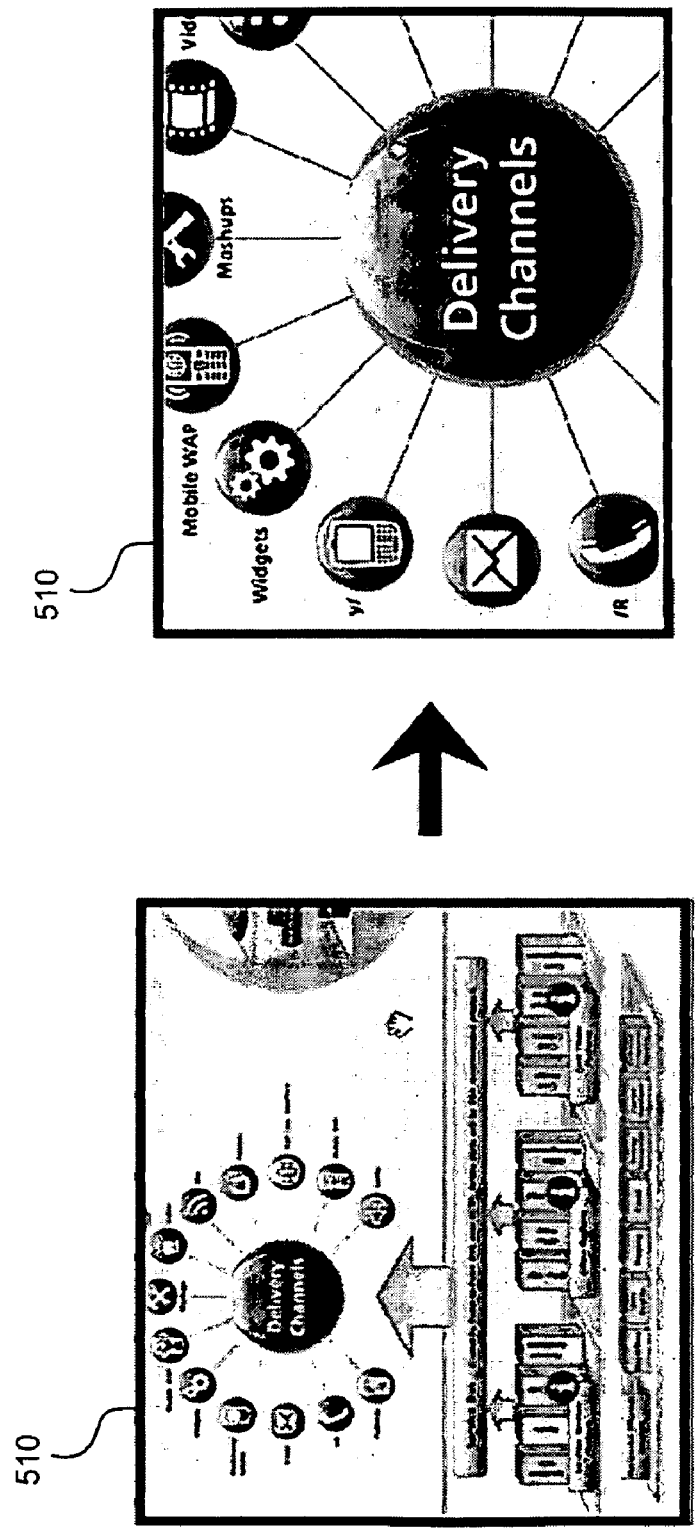
FIG. 7 depicts a portion of a dataflow process image with a changed zoom level.

FIG. 7 depicts a change in the zoom level of a dataflow process image from a first zoom level to a second zoom level to increase the zoom level so that more detail of a portion of the dataflow process is viewable. To increase or decrease the zoom level, the user can select the zoom controls 532 or by other specified operations. For example, in some embodiments, the user can zoom in on a desired location by double clicking on the location with the mouse. Once this selection is received, the environment 110 can zoom in and re-center the dataflow process image so that the select location is centered in the viewable area 510.

For embodiments where the dataflow process has a hierarchy (e.g., one or more of the nodes can be decomposed into at least one lower level dataflow subprocess), images of the lower level dataflow subprocesses can be obtained and divided into segmented image sections in a similar manner as those embodiments discussed above in FIG. 1-4. As a result, sets of segmented image sections can be created for lower level dataflow subprocess images.

FIG. 8 depicts navigating from one hierarchical level 800 to another hierarchical level 850 of a dataflow process illustrated using segmented image sections. For embodiments that include hierarchical levels, hierarchy information can be associated with a segmented image section of one hierarchical level having a corresponding segmented image section of another hierarchical level so that the environment can determine which segmented image sections to display when a user is navigating through the hierarchy. These segmented image sections can have selectable components associated with the segmented image sections, such as an embedded link, the implementation of which is known to those skilled in the art, so that when these segmented image sections are displayed the user can select the selectable component to facilitate navigation between levels 800 and 850 in the hierarchy. An identifier 802 can be depicted on the segmented image sections that have selectable components to identify whether the segmented image sections can be selected to navigate through the hierarchy.

In the present embodiment, a segmented image section 810 of the first hierarchical level 800 has a selectable component represented by identifier 802 that is selected by the user. Upon the selection, the environment 110 retrieves one or more segmented image sections 820 prior to updating the viewable area 510. The environment 110 updates the viewable area 510 using the one or more segmented image sections 820 and positions the one or more segmented image sections 820 in the grid 342 according to the absolute location information associated with the segmented image sections 820. While the present example illustrates two levels of hierarchy, those skilled in the art will recognize that any number of hierarchical levels can exist.

In some embodiments, some of the segmented image sections can have selectable components that when selected display additional information to the user by overlaying the additional information on the reconstructed dataflow process image and/or displaying the additional information next to the reconstructed dataflow process image. The additional information can be text-based, video-based, and/or audible sound.

Figure 9A:
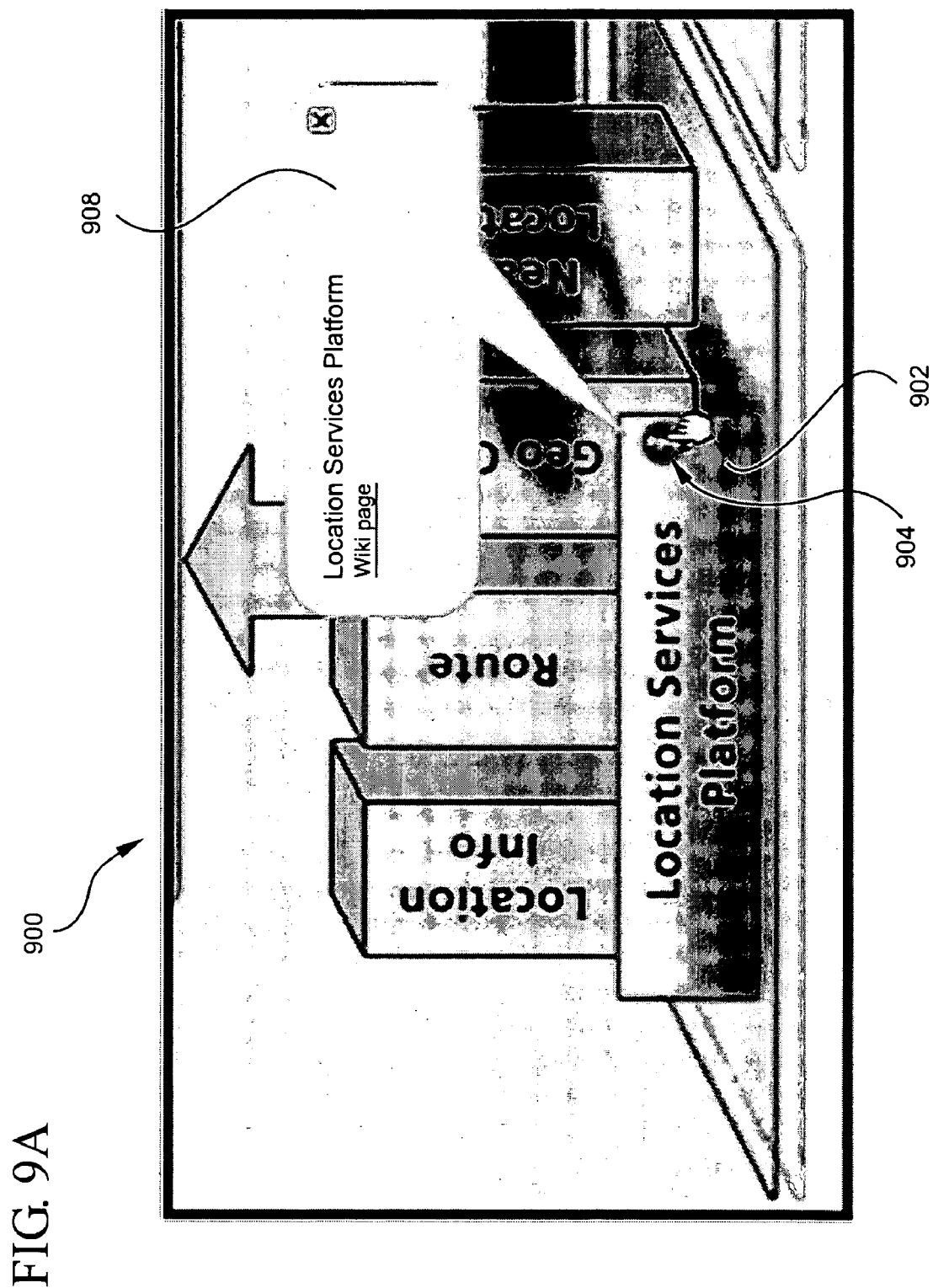
FIG. 9A-B depict exemplary additional information associated with the reconstructed dataflow process image in accordance with embodiments of the present invention.
Figure 9B:
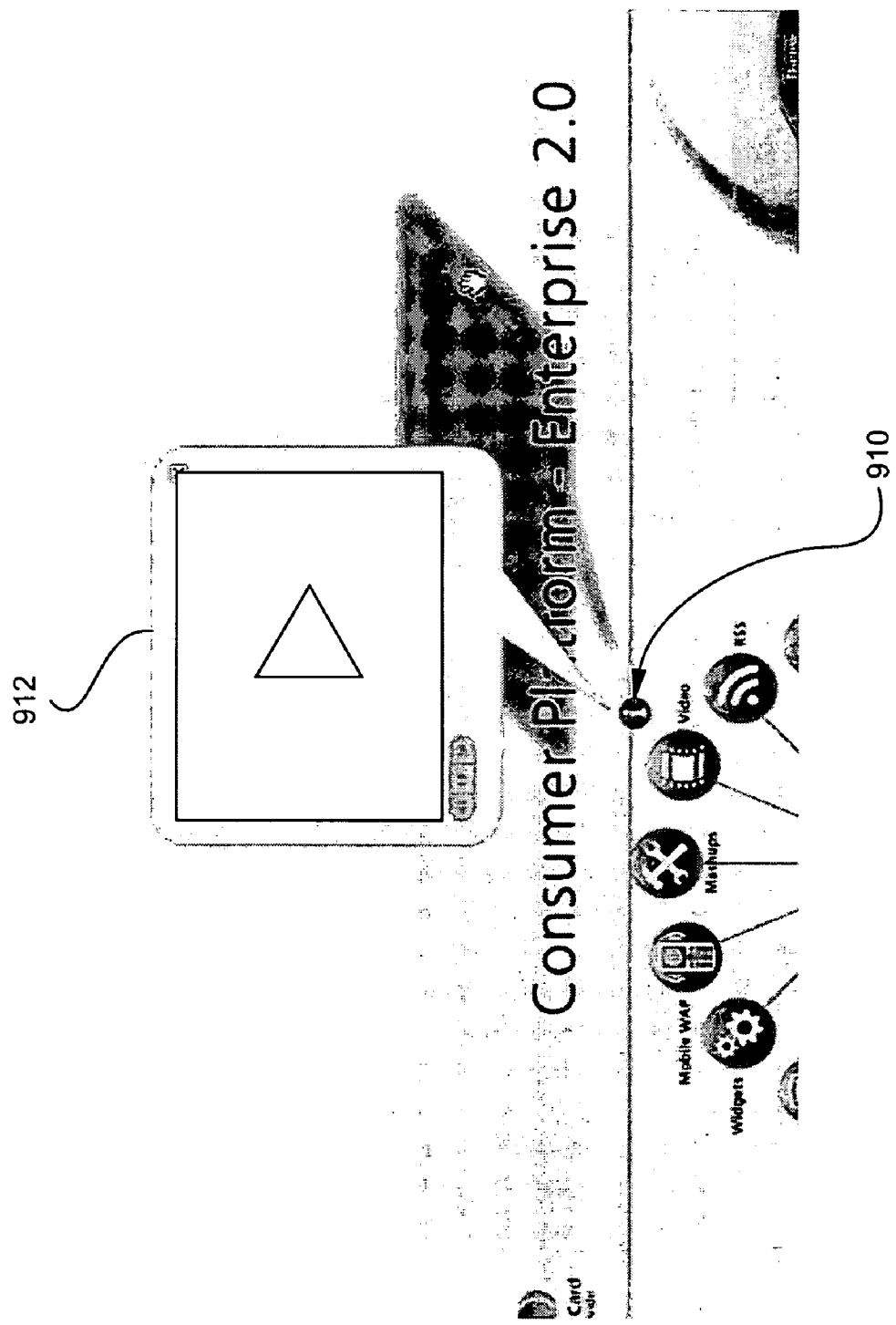

For example, referring to FIG. 9A, the reconstructed dataflow process image 900 can have a segmented image section 902 with a selectable component associated therewith, such as embedded links. The segmented images section 902 can include an additional information identifier 904, which can represent the selectable component, to identify to the user that there is additional information that can be viewed. The user can select the selectable component to view additional information 908, in this case text-based, which can overlay the reconstructed dataflow process image 900 and/or can be displayed next to the reconstructed dataflow process image 900. In another example, referring to FIG. 9B, the user can select the an identifier 910 representing a selectable component to view additional information 912, in this case video-based with audible sound, which can overlay the reconstructed dataflow image 900. For additional information that includes only audible sound, nothing may appear on the screen, but rather the user can hear the information through one or more speakers.

Figure 10:
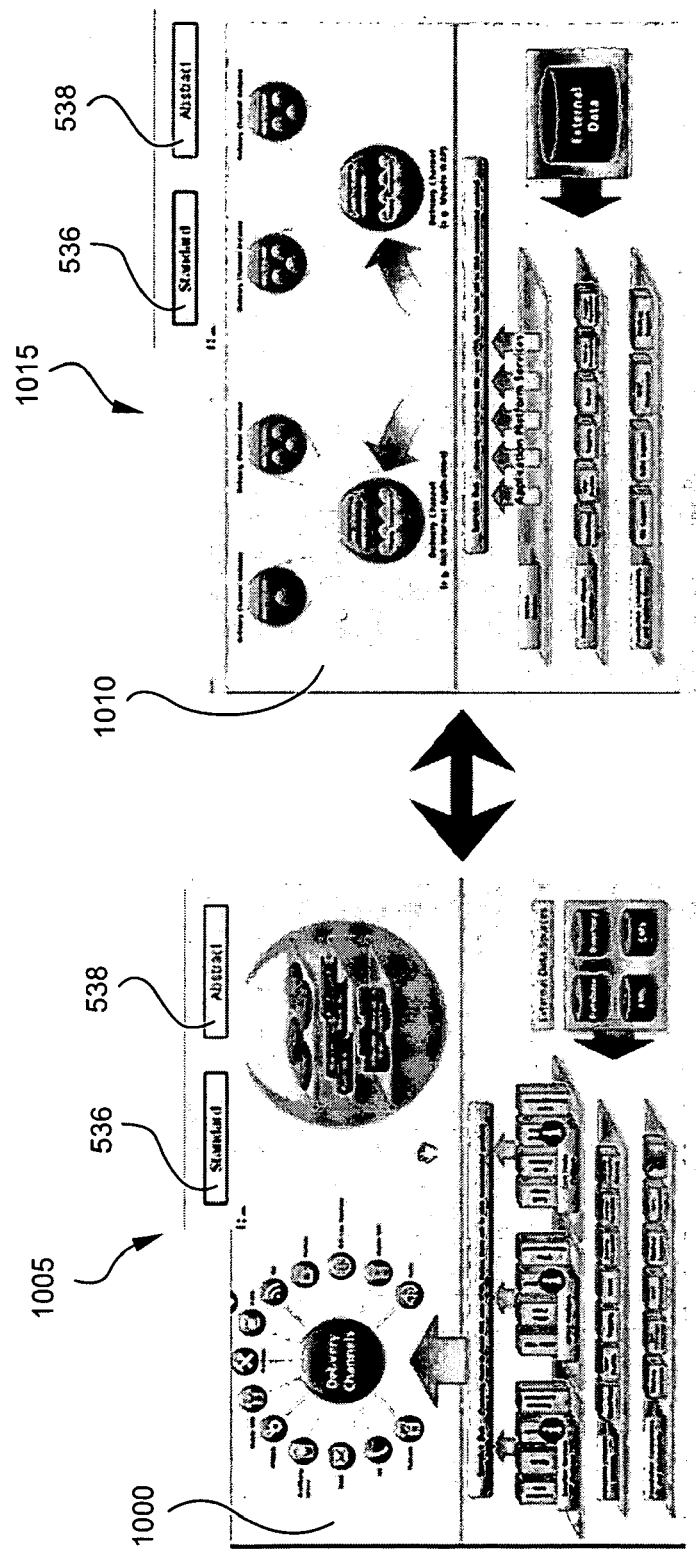
FIG. 10 depicts different exemplary view types that can be implemented to display a reconstructed dataflow process image.

FIG. 10 depicts change view types between different views or perspectives of the dataflow process images, such as, for example, a standard view and an abstract view. The different views provide the user with different perspectives of the dataflow process images so that the user can more readily observe certain aspects of the dataflow diagram represented by the reconstructed dataflow diagram process image. For example, the standard view can show data connections/flow, and the abstract view can show network connections. Other view can also be implemented, such as logical view, a runtime process view, a data structure view, and the like. To change views, the user can select the view control button 536 to display a reconstructed dataflow process image 1000 in a first view 1005, which is the standard view in this example and can select the view control button 538 to replace the reconstructed dataflow process image of the first view 1005 with a reconstructed dataflow process image 1010 of an second view 1015, which is an abstract view in this example. The segmented image sections forming the reconstructed dataflow image of the current view are replaced by segmented image section corresponding to the selected view so that the segmented image sections of the new view occupy the grid and are aligned so that the segmented image sections form a single integrated reconstructed image for the new view.

Figure 11:
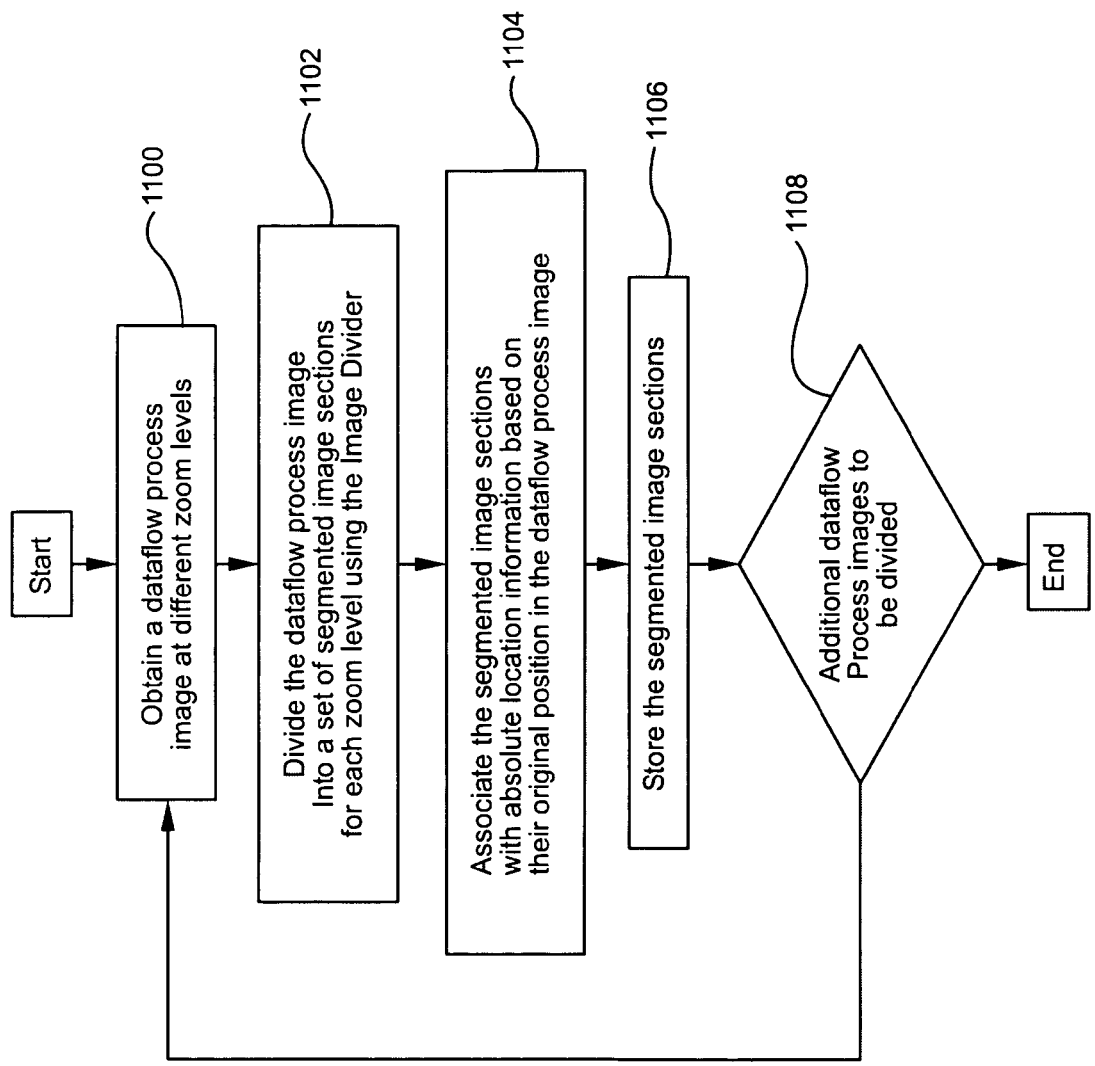
FIG. 11 is a flowchart to illustrate the generation of sets of segmented image sections.

FIG. 11 is a flowchart to illustrate the generation of sets of segmented image sections. A dataflow process image is obtained for an underlying dataflow process diagram at different zoom levels (step 1100). For each zoom level, a set of segmented image sections are created by dividing the dataflow process image (step 1102). The segmented sections of each set are associated with absolute location information based on the original position of the segmented image sections in the dataflow process image (step 1104). The segmented image sections are stored until they are retrieved for reconstruction of the dataflow process image (step 1106). If there are additional dataflow process images (step 1108), the process repeats from step 1100. Otherwise, the process ends.

Figure 12:
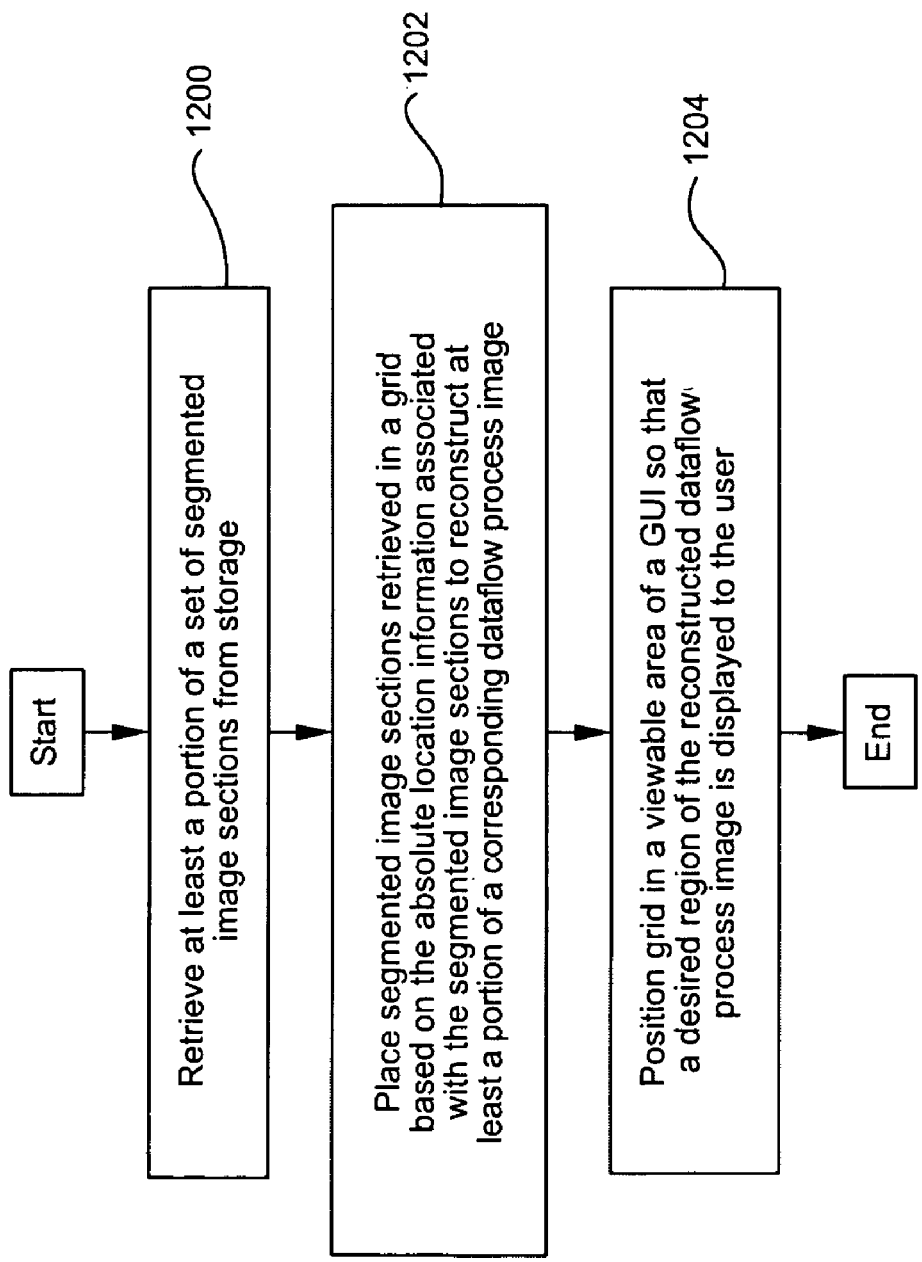
FIG. 12 is a flowchart to illustrate reconstructing a dataflow image using sets of segmented image sections.

FIG. 12 is a flowchart to illustrate reconstructing a dataflow image using sets of segmented image sections. The image reconstruction unit of the environment 110 retrieves at least a portion of a set of segmented image sections corresponding to at least a portion of a dataflow process image at a specified zoom level (step 1200). The segmented image sections are placed into a grid based on the absolute location information associated with the segmented image sections to reconstruct the at least a portion of the dataflow process image (step 1302). The segmented image sections are aligned in the grid so that the segmented images sections form a continuous, single reconstructed dataflow process image. The grid is subsequently positioned with respect to the viewable area so that a desired region of the reconstructed at least a portion of the dataflow process image is displayed to the user (step 1304).

Figure 13:
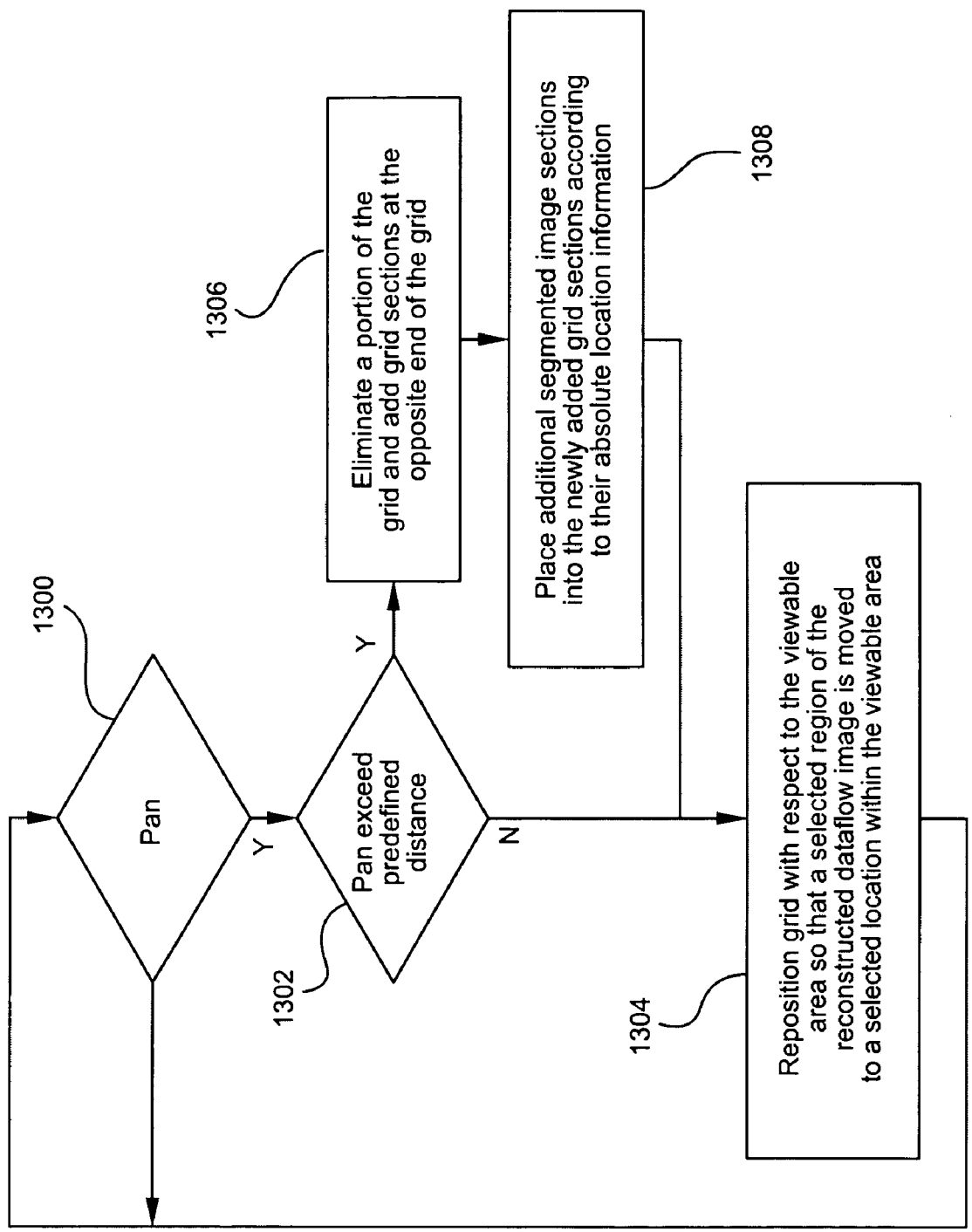
FIG. 13 is a flowchart illustrating a pan operation in accordance with a preferred embodiment of the present invention.

FIG. 13 is a flowchart illustrating a pan operation performed by the environment 110. The user can select a region of the reconstructed dataflow process image and drag it to another position in the viewable area. To achieve this, the environment determines if a pan operation has been invoked. If the user has not invoked the pan operation (step 1300), the environment simply waits for the next operating invoked by the user. If the pan operation has been invoked (step 1300), the environment determine whether the pan exceeds a predefined pan distance. If not (1302), the grid is repositioned with respect to the viewable area so that the selected region of the reconstructed dataflow process image is moved to the selected location within the viewable area (1304). Otherwise, the environment eliminates a portion of the grid and adds grid sections at the opposite end of the grid (step 1306). Additional segmented image sections are placed into the newly added grid sections according to their absolute location information (step 1308) and the grid is repositioned with respect to the viewable area so that a selected region of the reconstructed dataflow process image is moved to a selected location within the viewable area (step 1304).

Figure 14:
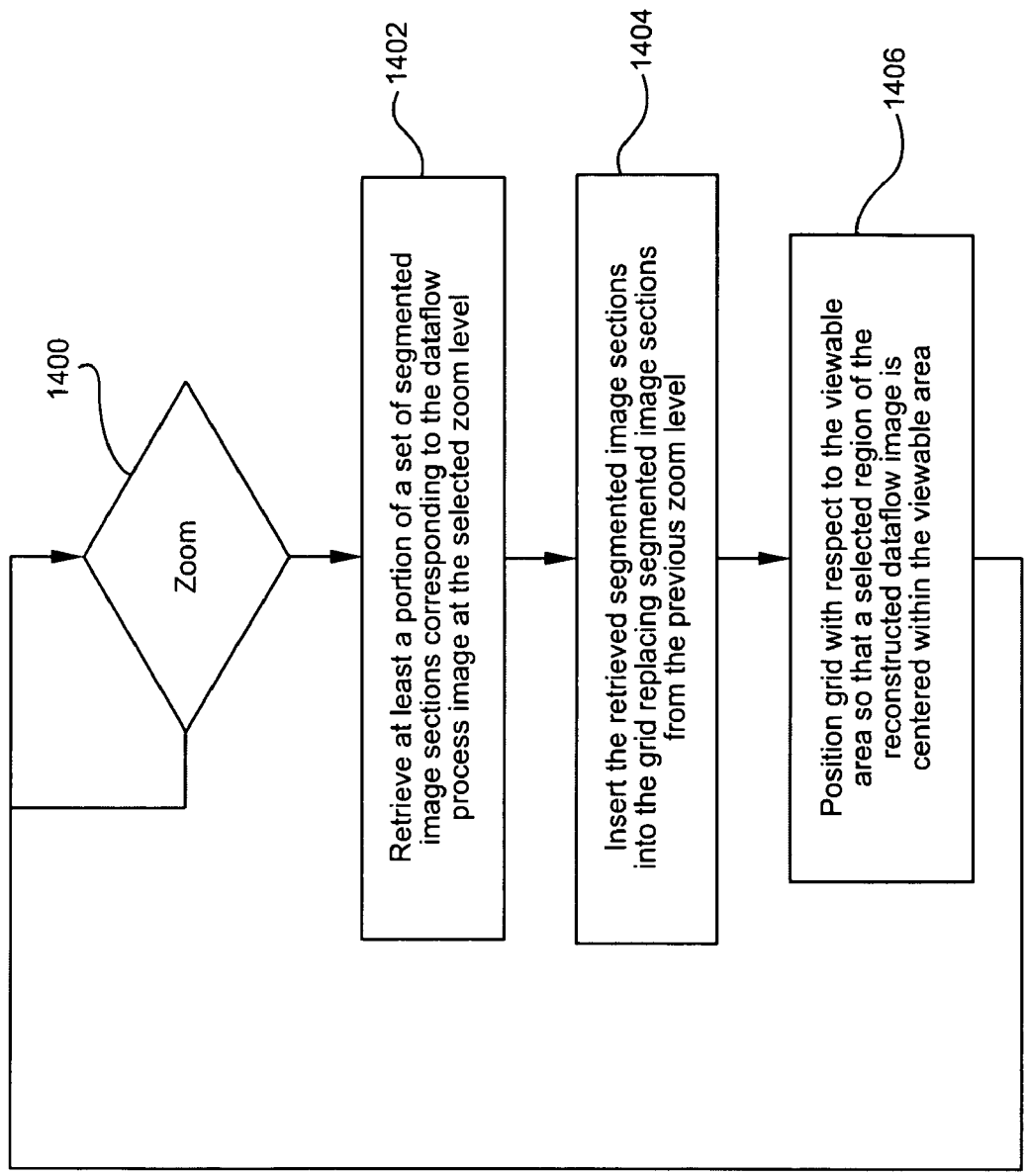
FIG. 14 is flowchart illustrating a change in zoom levels of a reconstructed dataflow image.

FIG. 14 is a flowchart illustrating a zoom operation performed by the environment 110. If a zoom operation is invoked (step 1400), at least a portion of a set of segmented image sections corresponding to the dataflow process image at the selected zoom level is retrieved (step 1402). The retrieved segmented image sections are inserted into the grid replacing segmented image sections from the previous zoom level (step 1404). In some embodiments, portions of sets of segmented image sections corresponding to the dataflow process image between the selected zoom level and the previous zoom level are retrieved and sequentially inserted into the grid to facilitate a smooth transition between the zoom levels to display an animated effect to the user. The grid is positioned with respect to the viewable area so that a selected region of the reconstructed dataflow image is centered within the viewable area (step 1406). If no zoom operation is invoked (step 1400), the environment simply waits for an operation to be invoked by the user.

Figure 15:
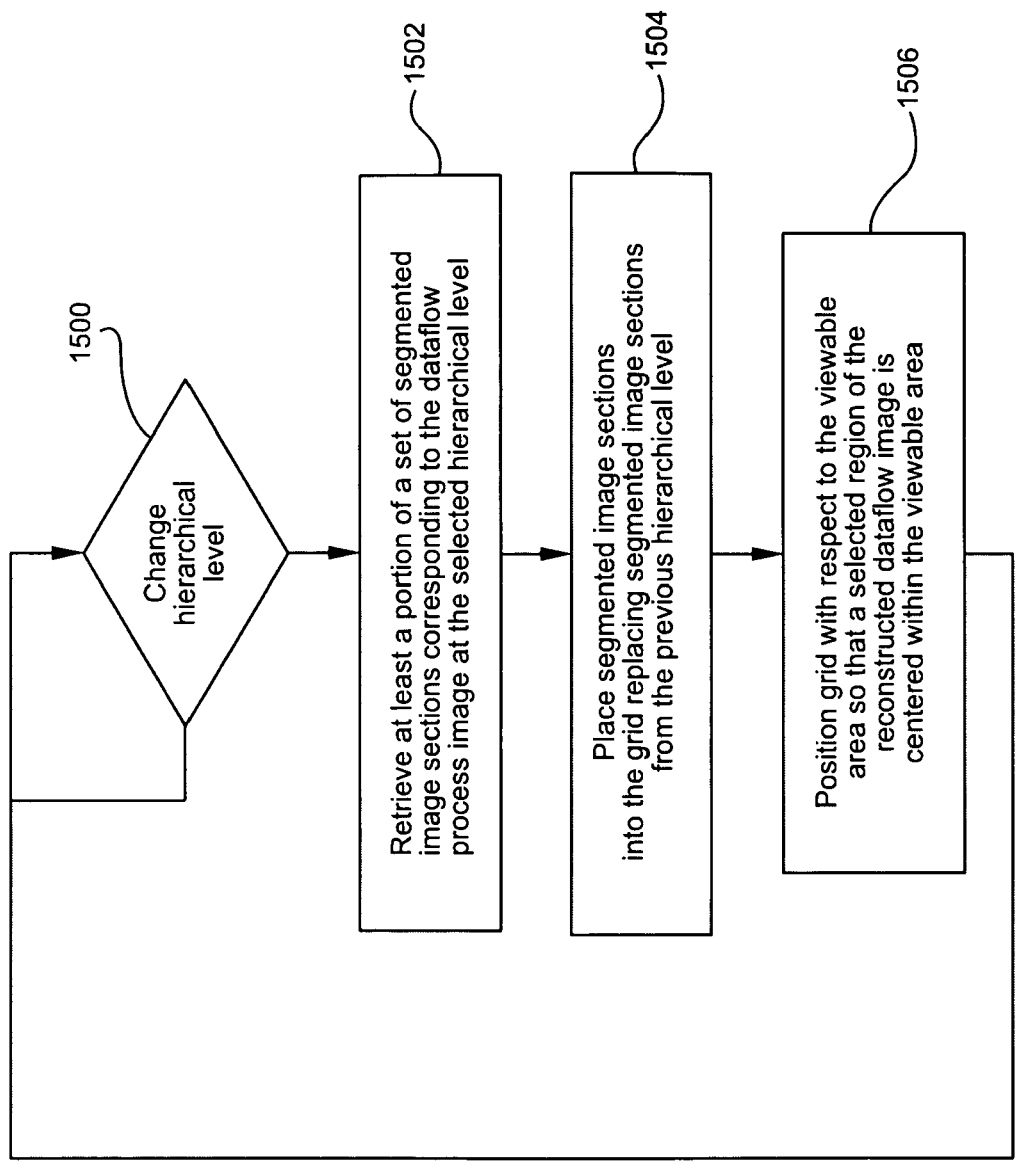
FIG. 15 is a flowchart illustrating a change in hierarchical levels of reconstructed dataflow process image.

FIG. 15 is a flowchart illustrating a change in hierarchically level operation performed by the environment 110. If a change in the hierarchical level displayed is invoked (step 1500), at least a portion of a set of segmented image sections corresponding to the dataflow process image at the selected hierarchical level is retrieved (step 1502). The retrieved segmented image sections are placed into the grid replacing segmented image sections from the previous hierarchical level (step 1504). The grid is positioned with respect to the viewable area so that a selected region of the reconstructed dataflow image is centered within the viewable area (step 1506). If no change in the hierarchical level is invoked (step 1500), the environment simply waits for an operation to be invoked by the user.

In some embodiments, the environment 110 and/or the files of the segmented image sections can have security features to limit access to certain images to authorized user. In one example, different hierarchical levels can be password protected so that only user with knowledge of the password can access those levels of the hierarchy. In another example, some or all users can access and view a reconstructed dataflow process image at a first zoom level, but may be required to enter a password to change to a higher zoom level, where details of the reconstructed dataflow process image can be more clearly depicted.

In some embodiments, the segmented image sections can be displayed using a mash-up with a third party mapping application, such as the Google Maps application program interface (API) from Google™. As used herein, "mash-up" refers to the combination of data from multiple sources into the integrated interactive graphical environment.

Figure 16:
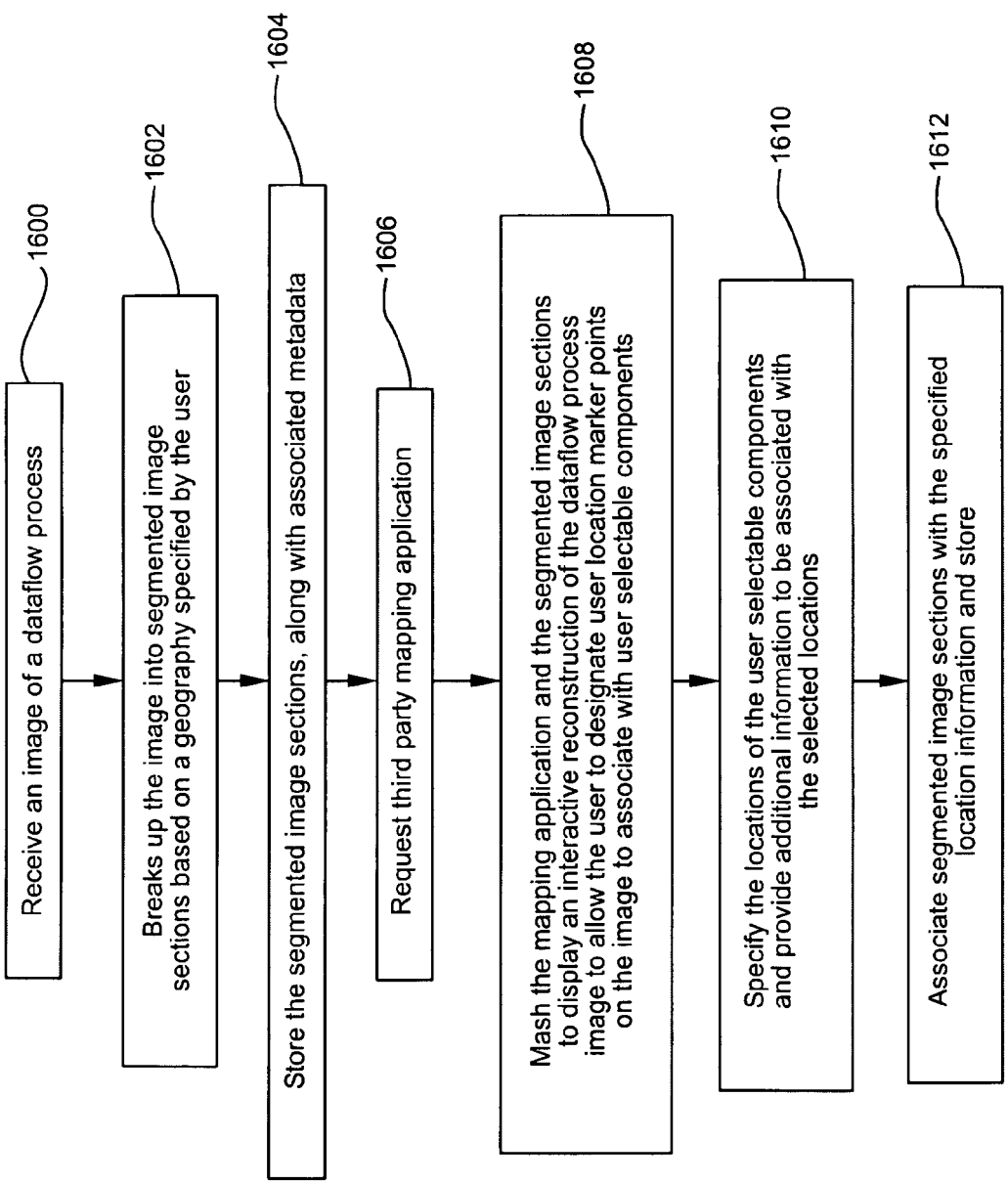
FIG. 16 is a flowchart illustrating the generation of segmented image sections using based on a mash up with the third party mapping application.

FIG. 16 is a flowchart illustrating the generation of segmented image sections using based on a mash up with the third party mapping application. To begin, a user can upload an image of a dataflow process to the environment 110 (step 1600). The environment 110 obtains the dataflow process image and breaks up the image into segmented image sections based on a geography specified by the user, for example, using a grid (step 1602). The segmented image sections, along with associated metadata, are stored (step 1604). Associating metadata with the segmented image sections allows users to assign user generated properties or information to the segmented image sections and location marker points, which can later be viewed, referenced, searched upon, etc. The third party mapping application is requested (step 1606) and the environment mashes the mapping application and the segmented image sections to display an interactive reconstruction of the dataflow process image to allow the user to designate user location marker points on the image to associate with user selectable components (step 1608). The user can select locations on the reconstructed dataflow process image to specify the locations of the user selectable components and can provide any additional information to be associated with the selected locations (step 1610). The segmented image sections can be associated with the specified location information and can be stored (1612).

Figure 17:
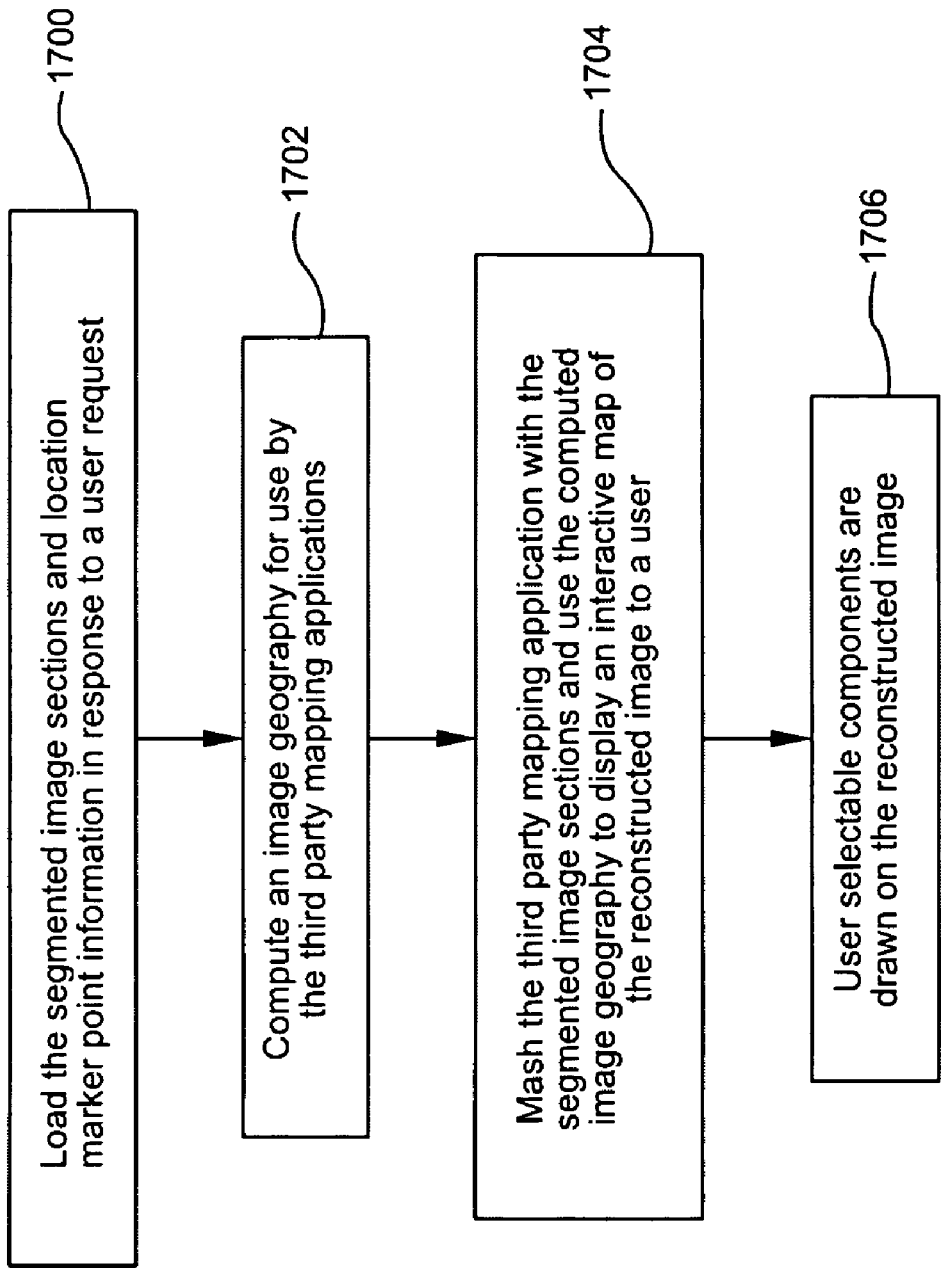
FIG. 17 is a flowchart illustrating the displaying of segmented image sections for interactive navigation by a user.

FIG. 17 is a flowchart illustrating the displaying of segmented image sections for interactive navigation by a user. The environment 110 loads the segmented image sections and location marker point information in response to the users request to view a reconstructed dataflow process (step 1700). The environment 110 computes an image geography for use by the third party mapping applications, based on the picture metadata associated with the segmented image sections (step 1702). The environment mashes the third party mapping applications with the segmented image sections and uses the computed image geography to display an interactive map of the reconstructed image to a user (step 1704). Previously specified user selectable components are drawn on the reconstructed image based on the associated location information of the segmented image sections (step 1706).

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method of navigating a dataflow process comprising:
obtaining a first set of segmented image sections corresponding to a dataflow process image;
displaying at least a portion of the first set of segmented image sections, the displayed segmented image sections forming a reconstructed dataflow process image of at least a portion of the dataflow process image and having an embedded user-selectable component;
associating the embedded user-selectable component of the reconstructed dataflow process image with at least a predetermined portion of the reconstructed dataflow process image;
receiving a selection of the embedded user-selectable component from a user, and responsive to the selection,
obtaining a second set of segmented image sections corresponding to a dataflow sub-process image;
updating the display by replacing the at least a portion of the first set of segmented image sections with at least a portion of the second set of segmented image sections, the displayed second set of segmented image sections forming a reconstructed dataflow process image of at least a portion of the dataflow sub-process image; and
responding to inputs from a user to interactively navigate the reconstructed dataflow process image or the reconstructed dataflow sub-process image, said inputs from a user to interactively navigate comprising at least one of an image zoom level input and an image pan input.

2. The method of claim 1 further comprising:
receiving a selection of the embedded user-selectable component from a user; and
responsive to the selection depicting additional information associated with a portion of the reconstructed dataflow process image.

3. The method of claim 2 further comprising overlaying the additional information over the reconstructed dataflow process image, the additional information and the reconstructed dataflow process image being viewable simultaneously.

4. The method of claim 1 further comprising associating at least one of the segmented image sections with location information to facilitate navigation to a location of the at least one of the segmented image sections.

5. The method of claim 1 further comprising changing a zoom level of the reconstructed dataflow process image so that greater detail of a region of the reconstructed dataflow image is viewable.

6. The method of claim 1 further comprising
panning from a first region of the reconstructed dataflow process image to a second region of the reconstructed dataflow process image.

7. The method of claim 6 further comprising:
representing the first region of the reconstructed dataflow process image using the first set of segmented image sections to form the reconstructed dataflow process image including the first region; and
representing the second region of the reconstructed dataflow process image using a second set of segmented image sections to form the reconstructed dataflow image including the second region.

8. The method of claim 7, wherein the first and second sets of segmented image data structure sections have at least one segmented image section in common.

9. The method of claim 1 further comprising associating metadata with at least one of the segmented image sections, the metadata including user specified information.

10. The method of claim 1 further comprising associating a security feature with at least one of the segmented image section to prevent an unauthorized user from viewing the at least one segmented image section.

11. The method of claim 1 further comprising:
obtaining a dataflow process image;
dividing the dataflow process image into segmented image sections based on a pattern; and
associating location information with the segmented image sections.

12. A computer readable storage device comprising instructions executable by a computing device to facilitate navigation of a dataflow process that, when applied to the computing device, causes the device to:
obtain a first set of segmented image sections corresponding to a dataflow process image;
display at least a portion of the first set of segmented image sections, the displayed segmented image sections forming a reconstructed dataflow process image of at least a portion of the dataflow process image and having an embedded user-selectable component;
associate the embedded user-selectable component of the reconstructed dataflow process image with at least a predetermined portion of the reconstructed dataflow process image;
receive a selection of the embedded user-selectable component from a user, and responsive to the selection,
obtain a second set of segmented image sections corresponding to a dataflow sub-process image;
update the display by replacing the at least a portion of the first set of segmented image sections with at least a portion of the second set of segmented image sections, thereby forming a reconstructed dataflow sub-process image of at least a portion of the dataflow sub-process image; and
respond to inputs from a user to interactively navigate the reconstructed dataflow process image or the reconstructed dataflow sub-process image, said inputs from a user to interactively navigate comprising at least one of an image zoom level input and an image pan input.

13. The storage device of claim 12, wherein the instructions further cause the device to:
depict additional information associated with a portion of the reconstructed dataflow process image.

14. The storage device of claim 12, wherein the instructions further cause the device to associate at least one of the segmented image sections with location information to facilitate navigation to a location of the at least one of the segmented image sections.

15. The storage device of claim 12, wherein the instructions further cause the device to change a zoom level of the reconstructed dataflow process image so that greater detail of a region of the reconstructed dataflow image is viewable.

16. The storage device of claim 12, wherein the instructions further cause the device to:
pan from a first region of the reconstructed dataflow process image to a second region of the reconstructed dataflow process image.

17. A system for navigating a dataflow process comprising at least one computing device configured to:
retrieve a first set of segmented image sections corresponding to a dataflow process image,
form a reconstructed dataflow process image on a display using the first segmented image sections and having an embedded user-selectable component,
associate the embedded user-selectable component of the reconstructed dataflow process image with at least a predetermined portion of the reconstructed dataflow process image;
receive a selection of the embedded user-selectable component from a user, and responsive to the selection,
retrieve a second set of segmented image sections corresponding to a dataflow sub-process image;
updating the display by replacing the reconstructed dataflow process image with a reconstructed dataflow sub-process image using the second segmented image sections; and
navigate the reconstructed dataflow process image or the dataflow sub-process image in response to inputs from a user, said inputs from a user to interactively navigate comprising at least one of an image zoom level input and an image pan input.

18. The system of claim 17, wherein the computing device is configured to associate at least one of the segmented image sections with location information to facilitate navigation to a location of the at least one of the segmented image sections.

19. The system of claim 17 wherein the computing device is configured to change a zoom level of the reconstructed dataflow process image so that greater detail of a region of the reconstructed dataflow image is viewable.

20. The system of claim 17, wherein the computing device is configured to pan from a first region of the reconstructed dataflow process image to a second region of the reconstructed dataflow process image.

* * * * *